(12) United States Patent
Bowers et al.

(10) Patent No.: US 9,996,804 B2
(45) Date of Patent: Jun. 12, 2018

(54) MACHINE LEARNING MODEL TRACKING PLATFORM

(71) Applicant: Facebook, Inc., Menlo Park, CA (US)

(72) Inventors: Stuart Michael Bowers, Menlo Park, CA (US); Parul Agarwal, Mountain View, CA (US); Parv Ajay Oberoi, Sunnyvale, CA (US); Hussein Mohamed Hassan Mehanna, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 540 days.

(21) Appl. No.: 14/684,041

(22) Filed: Apr. 10, 2015

(65) Prior Publication Data

US 2016/0300156 A1    Oct. 13, 2016

(51) Int. Cl.
*G06N 99/00* (2010.01)
*G06F 9/44* (2018.01)
*G06F 9/46* (2006.01)
*G06F 17/30* (2006.01)

(52) U.S. Cl.
CPC ............ *G06N 99/005* (2013.01); *G06F 8/00* (2013.01); *G06F 9/46* (2013.01); *G06F 17/30539* (2013.01)

(58) Field of Classification Search
None
See application file for complete search history.

(56) References Cited

U.S. PATENT DOCUMENTS

| | | | |
|---|---|---|---|
| 9,135,559 B1 * | 9/2015 | Chan | G06Q 30/0204 |
| 2009/0265290 A1 | 10/2009 | Ciaramita et al. | |
| 2010/0179855 A1 | 7/2010 | Chen et al. | |
| 2012/0054040 A1 | 3/2012 | Bagherjeiran et al. | |
| 2013/0191372 A1 | 7/2013 | Lee et al. | |
| 2014/0108308 A1 | 4/2014 | Stout | |
| 2014/0337096 A1 | 11/2014 | Gilad-Bachrach et al. | |
| 2015/0106311 A1 * | 4/2015 | Birdwell | G06N 3/02 706/20 |
| 2015/0379426 A1 | 12/2015 | Dirac et al. | |
| 2016/0358101 A1 | 12/2016 | Bowers et al. | |
| 2016/0358102 A1 | 12/2016 | Bowers et al. | |
| 2016/0358103 A1 | 12/2016 | Bowers et al. | |

(Continued)

OTHER PUBLICATIONS

U.S. Appl. No. 14/732,501 by Bowers, S., et al., filed Jun. 5, 2015.

(Continued)

*Primary Examiner* — Alan S Chen
(74) *Attorney, Agent, or Firm* — Fenwick & West LLP

(57) ABSTRACT

Some embodiments include a machine learner platform. The machine learner platform can implement a model tracking service to track one or more machine learning models for one or more application services. A model tracker database can record a version history and/or training configurations of the machine learning models. The machine learner platform can implement a platform interface configured to present interactive controls for building, modifying, evaluating, deploying, or compare the machine learning models. A model trainer engine can task out a model training task to one or more computing devices. A model evaluation engine can compute an evaluative metric for a resulting model from the model training task.

20 Claims, 6 Drawing Sheets

(56) References Cited

U.S. PATENT DOCUMENTS

| | | | |
|---|---|---|---|
| 2017/0017886 A1 | 1/2017 | Gao et al. | |
| 2017/0076198 A1 | 3/2017 | Bowers et al. | |
| 2017/0124486 A1* | 5/2017 | Chan | G06N 99/005 |
| 2017/0124487 A1* | 5/2017 | Szeto | G06N 7/005 |
| 2018/0004835 A1 | 1/2018 | Piechowicz et al. | |
| 2018/0004859 A1 | 1/2018 | Piechowicz et al. | |
| 2018/0007145 A1 | 1/2018 | Piechowicz et al. | |

OTHER PUBLICATIONS

U.S. Appl. No. 14/799,517 by Gao, T., et al., filed Jul. 14, 2015.
U.S. Appl. No. 14/851,336 by Jin, O., et al., filed Sep. 11, 2015.
Niu, F. et al., "HOGWILD!: A Lock-free Approach to Parallelizing Stochastic Gradient Descent", Computer Sciences Department, University of Wisconsin-Madison, Jun. 2011, pp. 1-22.
U.S. Appl. No. 15/199,335 by Piechowicz, S., et al., filed Jun. 30, 2016.
U.S. Appl. No. 15/199,351 by Piechowicz, S., et al., filed Jun. 30, 2016.
U.S. Appl. No. 15/199,403 by Piechowicz, S., et al., filed Jun. 30, 2016.
U.S. Appl. No. 14/732,509 by Bowers, S., et al., filed Jun. 5, 2015.
U.S. Appl. No. 14/732,513 by Bowers, S., et al., filed Jun. 5, 2015.
Demšar, Janez, et al. "Orange: data mining toolbox in Python," *The Journal of Machine Learning Research* 14.1 (2013): 2349-2353.
RapidMiner Studio Manual, 2014, [online], [retrieved on Aug. 13, 2015]. Retrieved from: <http://docs.rapidminer.com/downloads/RapidMiner-v6-user-manual.pdf>, 116 pages.
Microsoft Azure, "Machine Learning: Powerful cloud-based predictive analytics." [website], [retrieved on Aug. 13, 2015]. Retrieved from the internet: http://azure.microsoft.com/en-us/services/machine-learning/, 2014, 6 Pages.
Leroux et al. A Genetic Programming Problem Definition Langauge Code Generator for the EpochX Framework, Proceedings of the Companion Publication of the 2014 Annual Conference on Genetic and Evolutionary Computation, 2014, pp. 1149-1154.
Non-Final Office Action dated Nov. 30, 2017 for U.S. Appl. No. 14/799,517 by Gao, T., et al., filed Jul. 14, 2015.
Non-Final Office Action dated Oct. 4, 2017 for U.S. Appl. No. 14/732,501 for Bowers, S. filed Jun. 5, 2016.
Non-Final Office Action dated Sep. 25, 2017 for U.S. Appl. No. 14/732,513 for Bowers, S. filed Jun. 5, 2016.

* cited by examiner

MACHINE LEARNING MODEL TRACKING PLATFORM

BACKGROUND

"Big data" is a broad term for datasets so large or complex that traditional data processing applications are often inadequate. For example, a social networking system can run several application services that pertain to big data. The term "big data" also often refers to the use of predictive analytics or other methods to extract values from data. For example, analysis of datasets can find new correlations, trends, patterns, categories, etc. Such analysis rely on machine learning.

A typical machine learning workflow may include building a model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, the validation set, and/or the test set can respectively include pairing of input datasets and expected output datasets corresponding to those input datasets.

A variety of web-based or mobile applications often rely on machine learning models to process large and complex "big data" to provide application services (e.g., personalized or targeted application services) to a large number of users. There is frequently a need for higher accuracy and/or consistency models while the requirements of these models are ever evolving. The training and evaluation of these models nevertheless take time and are typically the manual burdens of one or more developers or analysts. Developers and/or analysts have to manually update the parameters and training sets for the models in order to keep the models current, but are often challenged by having to manually analyze the models to determine betters ways of evolving the models.

Figure 1:
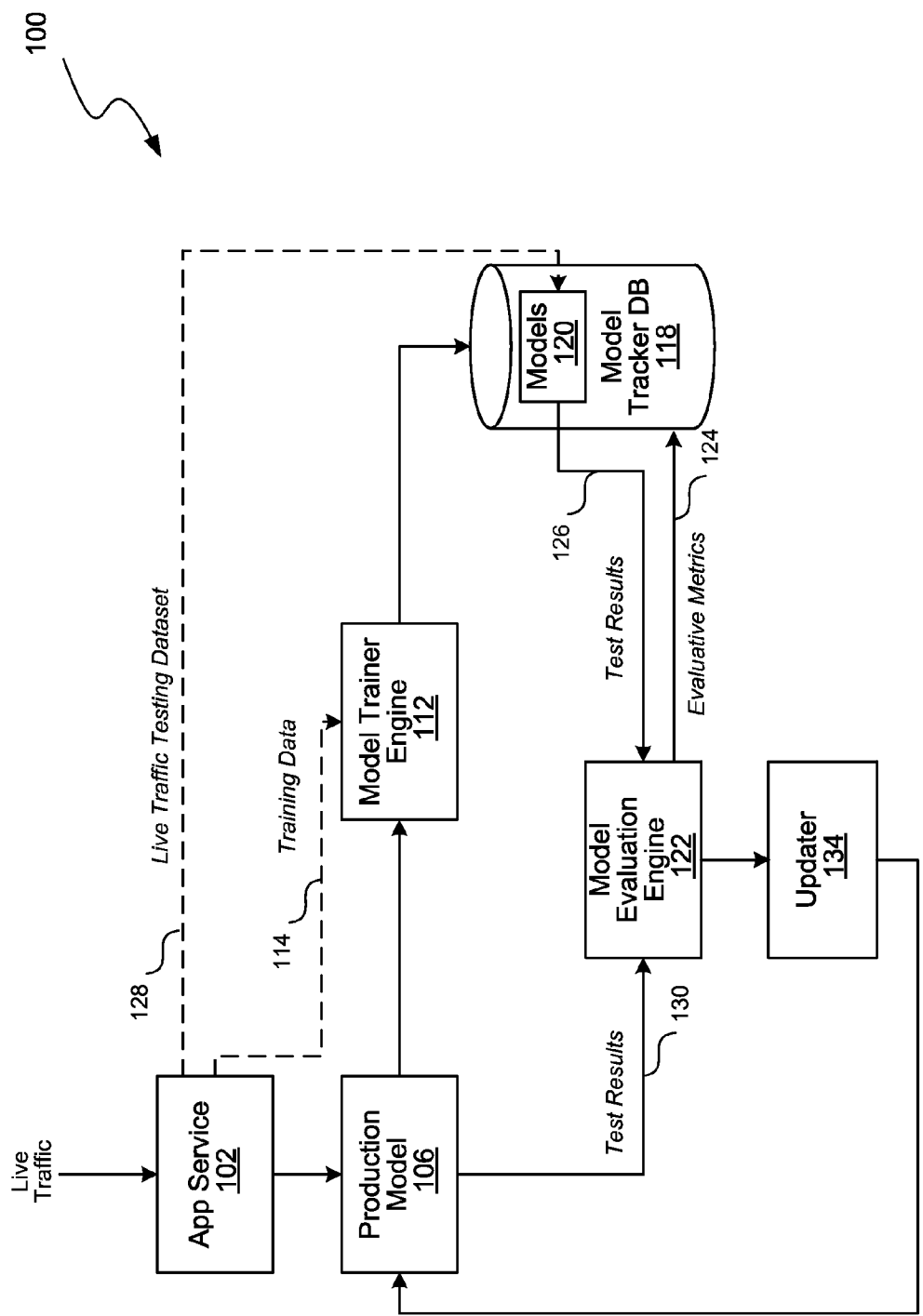
FIG. 1 is a control flow illustrating a machine learning workflow for an application service, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Several embodiments include a machine learner system implemented by one or more computing devices. The machine learner system can implement a model tracker service to assist enterprise users in training and evaluating (e.g., validating, scoring, and/or testing) one or more "latent" models (e.g., not yet in production) that may potentially replace production models (e.g., deployed for used in a computer system processing target input data). In some embodiments, the target input data can be real-time input data. The machine learner system advantageously improves the workflow of building and optimizing (e.g., accuracy, consistency, efficiency, or any combination thereof) machine learning models by providing a model tracking service and a model tracking interface.

The model tracker service can automatically make a copy of a latent model in response to the latent model being updated into production (e.g., as a "production model" for an application service). The production copy can be a verbatim copy of the production model. In some embodiments, the model tracker service can provide the production copy through a user interface as a template to create and/or train new latent models. In several embodiments, the user interface enables an application operator (e.g., a developer/analyst user or an analyst user) to edit configurations of the production copy. For example, the application operator can edit the configurations by adding or removing one or more training datasets or sources of the training datasets, one or more features of interest to use, one or more parameters a model training algorithm (e.g., Gaussian Mixture Model (GMM) algorithm, Support Vector Machine (SVM) algorithm, neural network algorithm, Hidden Markov Model (HMM) algorithm, etc.), or any combination thereof. Based on the edits received via the user interface, the machine learner system can generate a new latent model (e.g., by training the latent model based on the specified configurations). The machine learner system can also generate a new latent model by enabling a user to specify configurations (e.g., training datasets, sources of training sets, features of interest, parameters, or any combination thereof) of the latent model from scratch. In turn, the machine learner system can train the new latent model based on the configurations.

In several embodiments, the machine learner system includes a model tracker service that can continuously train one or more latent models as new training datasets (e.g., captured from live traffic to/from the specified sources of training datasets) become available. For example, the new training datasets can be captured by one or more application services in a social networking system.

The model tracker service can compare one or more of the test models against the production model copy offline. For example, the model tracker service can compare test results (e.g., based on the same test or validation dataset as inputs) of the production model copy and test models. The analytics of the offline comparison is provided via the user interface. Through the user interface, an application operator can select a test model for live traffic testing and parameters (e.g., schedule, launch time, test duration, sources of live traffic, termination condition, or any combination thereof) for the live traffic testing.

The analytics of multiple live traffic tests (e.g., for the same test model or different test models) is also presented through the user interface. The user interface can enable the enterprise user to push the test model into production. The model tracker service can maintain source control trails of the production machine learning models for the application services and thereby enabling error identification in and/or roll back of the production machine learning models.

FIG. 1 is a control flow illustrating a machine learning workflow 100 for an application service 102, in accordance with various embodiments. The application service 102 can process client requests in real-time. The client requests can be considered "live traffic." For example, the application service 102 can be a search engine, a photo editing tool, a location-based tool, an advertisement platform, a media service, an interactive content service, a messaging service, a social networking service, or any combination thereof.

The application service 102 can rely on at least a machine learning model to make a decision (e.g., whether to present a content or to process a request) related to processing a client request. The machine learning model in use by the application service 102 may be referred to as the "production model 106." The production model 106 can process a set of input data, based on the live traffic and/or historical data corresponding to the live traffic, and produce a result (e.g., a machine categorization or a machine computed score) that can be used by the application service 102 to make the decision.

Figure 2:
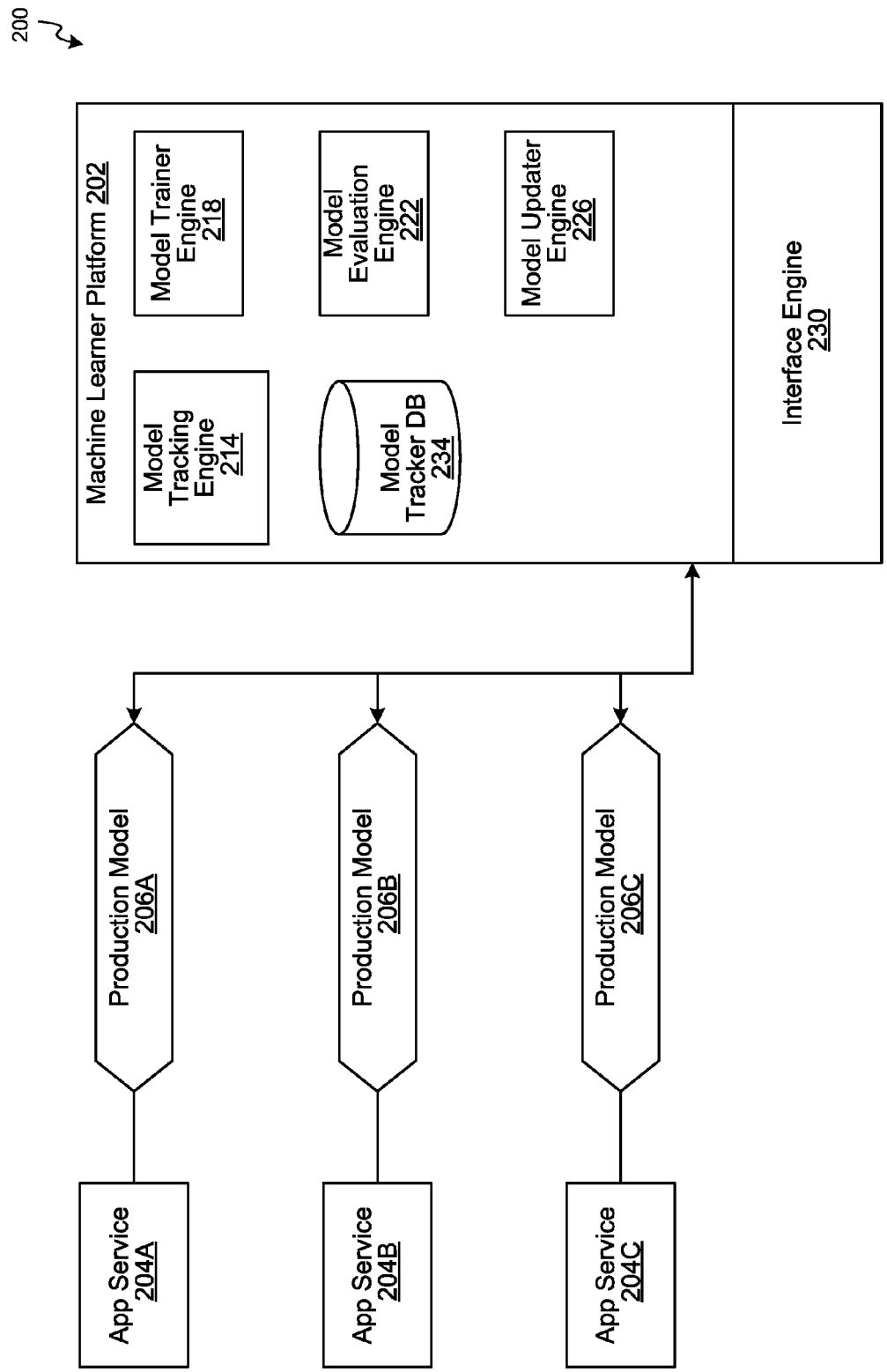
FIG. 2 is a block diagram illustrating an application service system implementing a machine learner system, in accordance with various embodiments.

In several embodiments, the machine learning workflow 100 can rely on a machine learner platform implemented by a machine learner system (e.g., the machine learner system 202 of FIG. 2). The machine learner platform can produce (e.g., clone) a production copy of a machine learning model when the machine learning model is being deployed as the production model 106 for the application service 102. The production copy can be used as a template for developer/analyst users to produce modified models based on the production copy. For example, a machine learner platform can include a machine learner interface (e.g., a developer/analyst interface). The machine learner interface enables a developer/analyst user to modify (e.g., add or remove) sources of training datasets and/or data features for training a model from existing training configurations of the production copy.

In some embodiments, the machine learner platform can include a model trainer engine 112. The model trainer engine 112 can schedule recurring training sessions to produce additional latent models based on the production copy. For example, the model trainer engine 112 can detect that the designated sources of training datasets have collected additional training data 114 (e.g., above a certain quantity threshold), and schedule a new training session based on the collected additional training data. This process can repeat indefinitely as the model trainer engine 112 schedules automatic recurring training sessions to improve and optimize a latent model that can potentially replace the production model 106.

The model trainer engine 112 can be coupled to a model tracking service (e.g., implemented by the model tracking engine 214 of FIG. 2). The model tracking service can record the latent model in a model tracker database 118. The model tracker database 118 can store one or more machine learning models 120. The model tracking service can also record the training configurations used to generate the latent model in the model tracker database 118. In some embodiments, the model tracking service can index the latent model in the model tracker database 118 based on the training data source used, the training dataset used, the data features used, or any combination thereof, in creating and training the latent model. In some embodiments, the model tracking service can store a version history of the latent model in the model tracker database 118. The version history can include a provenance chain of the latent model. Tracking the version history can include tracking one or more modifications from a previous machine learning model to a subsequent machine learning model. For example, the version history can include the production copy as a parent model. The production copy can be based on (e.g., modified from) another machine learning model, and this other machine learning model can be a grandparent model to the latent model in question. In some embodiments, the model tracking service can track and record one or more differences in training configurations of the latent model as compared to its parent model (e.g., the production copy) in the model tracker database 118. The tracked differences in the training configurations can include differences in one or more sources of training datasets, one or more training datasets, one or more data features, or any combination thereof that were used to train the latent model.

In some embodiments, a model evaluation engine 122 can perform offline testing of the latent model and compute evaluative metrics 124 based on the offline testing results 126. The evaluative metrics can be one or more binary values (e.g., "validation criteria failed" or "validation criteria passed"), discrete values (e.g., a discrete score between 0 and 10), or continuous (e.g., a percentage of the expected results that the latent model is able to reproduce by running a validation dataset or a percentage of overlapping results between the latent model and the production copy). For example, the offline testing can be a comparison of results of running the same test dataset through the latent model and the production copy. The offline testing can be a comparison of the results of running a validation dataset through the latent model and the expected results corresponding to the validation dataset (e.g., a set of crucial test cases or a set of random input data with known results). The offline testing can produce other performance-related scoring when running the latent model (e.g., memory consumption, equal error rate, consistency rating, variance of results, false positive rates, false negative rates, etc.). The evaluative metrics from the offline testing can also be stored in the model tracker database 118.

Each model in the model tracker database 118 can be associated with one or more developer/analyst users, one or more application services, one or more training configurations, experimental metadata associated with testing the model, a version history of the model, evaluative metrics of the model, or any combination thereof. The model tracker database 118 can further track whether the models are currently in production, currently undergoing live testing (e.g., with a subset of live data 128), currently undergoing recurring training (e.g., with additional training data from designated sources), idling, or any combination thereof. In some embodiments, the machine learner platform can implement a machine learner interface with a query widget, a comparison widget, and/or a table listing widget to access the model tracker database 118. In some embodiments, the machine learner platform can implement an automated messaging/notification process based on the statuses of the models. For example, if a model is undergoing recurring training (e.g., thereby consuming computational resource from a pool of computing devices) but not serving any live traffic, the machine learner platform can send a message (e.g., an email message, a text message, an enterprise-level internal message, or any combination thereof) to one or more developer/analyst users associated with the model to terminate the schedule for recurring training. For another example, if the evaluation metrics of a model falls below a threshold or above a threshold, the machine learner platform can send a message to flag the model's success or failure. In some embodiments, the message can include an evaluation report containing a rendering of its evaluative metric statistics and/or a comparison report containing a rendering of a comparison diagram or table between the evaluative metrics and/or training configurations of the model and another model.

In several embodiments, the model evaluation engine 122 can also perform live data testing (referred to as "online testing") of one or more of the models. For example, a developer/analyst user can interact with the machine learner interface to trigger a live testing of a latent model. The machine learner interface can receive live testing parameters defining conditions of the live testing. For example, the live testing parameters can include one or more filters (e.g., a geographic filter of incoming service requests or a user profile filter of user involved in incoming service requests) on the live traffic data that serves as the test dataset. The model evaluation engine 122 can compute the evaluative metrics 124 based on live testing results 130.

In several embodiments, the machine learning interface enables the developer/analyst users of a latent model to update/push the latent model into production via an updater engine 134. In other embodiments, the machine learner system 100 or a developer/analyst user can set a threshold constraint (e.g., one or more threshold values along one or more metric dimensions) in the model evaluation engine 122 or the update engine 134 such that when the evaluative metrics 124 satisfy the threshold constraint, the latent model is automatically pushed into production by the updater engine 134. The update/push action can trigger the updater engine 134 to replace the production model 106 with the latent model. In response to this update, the updater engine 134 can again make a production copy of the new production model.

FIG. 2 is a block diagram illustrating an application service system 200 implementing a machine learner system 202, in accordance with various embodiments. For example, the application service system 200 can be a social networking system (e.g., the social networking system 502 of FIG. 5). The application service system 200 can run one or more application services (e.g., an application service 204A, an application service 204B, and an application service 204C, collectively as "the application services 204").

Each of the application services 204 can run at least a production model to serve its live service request traffic. For example, the application service 204A can implement a production model 206A; the application service 204B can implement a production model 206B; and the application service 204C can implement a production model 206C.

The machine learner system 202 implements a platform to service developers and data analysts who are responsible for maintaining the application services 204 in the application service system 200. The platform can interact with the developer/analyst users via a user interface. The machine learner system 202 can implement one or more of a model tracking engine 214, a model trainer engine 218 (e.g., the model trainer engine 112 of FIG. 1), a model evaluation engine 222 (e.g., the model evaluation engine 122 of FIG. 1), a model updater engine 226 (e.g., the updater engine 134 of FIG. 1), an interface engine 230 (e.g., implementing the user interface) and a model tracker database 234 (e.g., the model tracker database 118 of FIG. 1).

The model tracking engine 214 implements a model tracking service. The model tracking service can track one or more machine learning models (e.g., including the production models 206A, 206B, and 206C) for one or more of the application services 204. The model tracker database 234 is configured to record data and metadata associated with the machine learning models tracked by the model tracking engine 214. For example, the model tracker database 234 can store and index the machine learning models by version histories, sources of training dataset, training datasets, training configurations, evaluative metrics, or any combination thereof, such that the model tracker database 234 can be queried using one of these variables.

In some embodiments, the model tracking service can tracking a version history of a machine learning model (e.g., a latent or a production model). The version history can be represented by a provenance chain of one or more machine learning models that are based on one another in order. For example, the version history can include one or more modifications from a previous machine learning model in the provenance chain to a subsequent machine learning model in the provenance chain. The version history can be used to facilitate roll back of a defective model in production.

For example, the model tracking service can receive an indication that a machine learning model is corrupted. Based on tracked training configuration modification of the corrupted model as compared to a previously working model in the version history, the model tracking service can identify a problematic training dataset or a problematic data feature. The previously working model can be the most recent working model in the provenance chain of the corrupted model. The model tracking service can instead receive user indication of a problem data source or a problem data feature. In that case, the model tracking service can identify a model as being corrupted in the model tracker database 234, where the model is trained with the problem data source or the problem data feature. Regardless, in response to identifying the corrupted model and when the corrupted model is in production, the model tracking service can trigger/cause a rollback of the corrupted model by replacing the corrupted model with the previously working model.

The interface engine 230 can implement the user interface of the machine learner platform (e.g., referred to as the "machine learner interface") for developer and/or analyst users. The machine learner interface can present interactive controls for building, modifying, tracking, training (e.g., manually or automatically according to a schedule and a training plan), evaluating, and/or deploying the machine learning models tracked by the model tracking engine 214. In some embodiments, the machine learner interface can present a comparison report of two or more of the machine learning models by presenting a rendering of each model's training configurations and evaluative metrics side-by-side.

In one example, the machine learner interface can receive a provenance query targeting a target machine learning model. In response, the machine learner interface can render a diagram representing the version history from the model tracker database 234. The diagram can illustrate one or more related machine learning models of the target machine learning model in response to the provenance query.

In another example, the machine learner interface can receive a search query targeting a particular dataset or a particular data feature. In response to receiving the search query, the machine learner interface can present one or more target machine learning models and evaluation statistics of the target machine learning models by querying the model tracker database 234 to identify the target machine learning models that utilized the particular dataset or the particular data feature. In some embodiments, in response to receiving the search query, the machine learner interface can further present one or more deployment statuses corresponding to the target machine learning models.

The model trainer engine 218 implements a model training service. For example, the monitoring service can automatically task out a model training task (e.g., a recurring task) to a pool of one or more computing devices. In response, the model tracking service can track, in the model tracker database 234, one or more training configurations of a latent model resulting from the model training task.

The model evaluation engine 222 implements a model evaluation service, including testing, evaluation, and/or validation. The model evaluation service can compute one or more evaluative metrics of a machine learning model (e.g., as described for the model evaluation engine 122). In some embodiments, the machine learner interface can present the evaluative metric for a machine learning model along with the training configurations of the machine learning model to facilitate evaluation of the resulting model (e.g., by a developer/analyst user using the machine learner interface). In some embodiments, the model evaluation engine 222 can detect corruption of a machine learning model based on a computed evaluative metric of the machine learning model.

The model evaluation engine 222 can conduct either offline testing and/or live testing of a machine learning model of an application service. For example, the model evaluation engine 222 can serve a substantial portion of the live service request traffic while a smaller portion of the live service request traffic is routed by the model evaluation engine 222 to one or more latent machine learning models undergoing live testing.

In one example, the model evaluation engine 222 runs a test dataset through two or more machine learning models. The machine learner interface can generate a comparison report by comparing training configurations of the two or more machine learning models and comparing results and/or evaluative metrics of the results of running the test dataset. In some embodiments, the test dataset is a static dataset. In some embodiments, the test dataset is a dynamically changing dataset of an application service (e.g., live testing). In some embodiments, a developer/analyst user can select which of the two or more machine learning models to compare. In some embodiments, the machine learner interface can present a comparison of a machine learning model and its parent model (e.g., the model that the machine learning model is modified from) by default. In some embodiments, the machine learner interface can present a comparison of a machine learning model and the production model or a copy of the production model by default.

In some embodiments, the model evaluation engine 222 computes a ranking of at least a subset of the machine learning models in the model tracker database 234. For example, the ranking can be based on values of one type of evaluative metrics corresponding to the subset of the machine learning models stored in the model tracker database 234. The machine learner interface can then present the ranking (e.g., upon request or as part of a listing of the machine learning models).

In some embodiments, the model evaluation engine 222 can detect corruption of a machine learning model. For example, the model evaluation engine 222 can detect corruption based on an evaluative metric of the machine learning model. In some embodiments, the machine learner interface can receive a user indication that a dataset is defective. In response to the machine learner interface receiving the user indication of the defective dataset, the model tracking engine 214 can query the model tracker database 234 to identify one or more of the machine learning models that used the defective dataset to train and mark the identified machine learning models as potentially defective in the machine learner interface.

The model updater engine 226 manages production models and deployment of a latent model into production for one or more of the application services 204. The model updater engine 226 can trigger deployment in response to receiving a user command at the machine learner interface. In several embodiments, upon deployment of a latent model into production, the model updater engine 226 can automatically clone a copy of the latent model going into production as a production copy template. The production copy template enables developer/analyst users to base new latent models from the production copy template.

Figure 3:
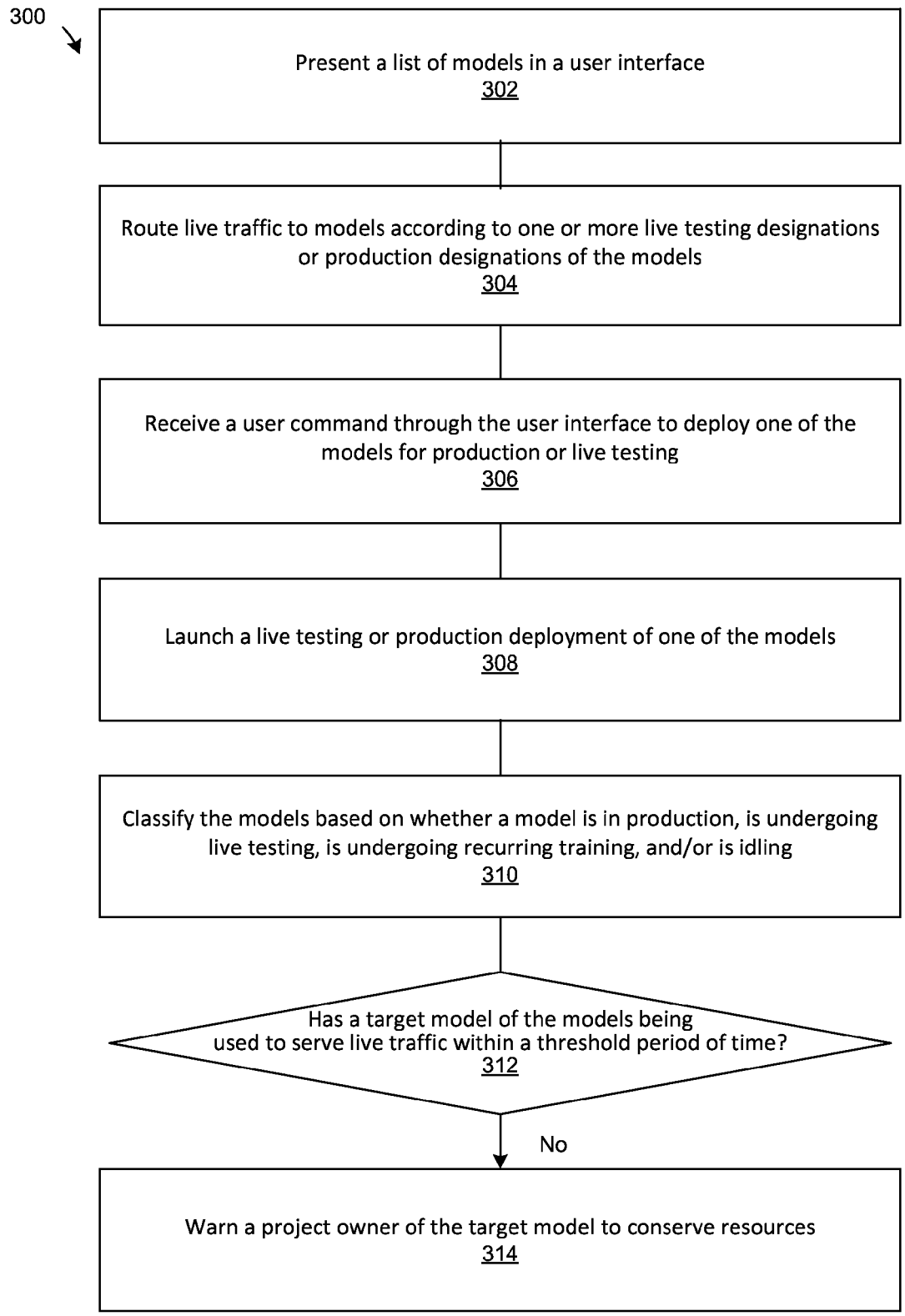
FIG. 3 is a flow chart of a method of implementing a model tracking service, in accordance with various embodiments.

FIG. 3 is a flow chart of a method 300 of tracking machine learning models, in accordance with various embodiments. The method 300 can be executed by a machine learner system (e.g., the machine learner system 202 of FIG. 2). At step 302, the machine learner system can present a list of models in a user interface. The machine learner system can identify the list of models from the models tracked by a model tracking service. Each of the models can service one or more application services.

At step 304, the machine learner system can route live traffic to one or more of the models according to one or more live testing designations or production designations of the one or more of the models. At step 306, the machine learner system can receive a user command through the user interface to deploy one of the models for production or live testing. At step 308, the machine learner system can launch a live testing or production deployment of one of the models. The machine learner system can track deployment statuses (e.g., production deployment or live testing deployment) whenever a developer/analyst user initiates deployment of a model. In response, the machine learner system can label the model respectively with the production designation or live testing designation.

At step 310, the machine learner system can classify the models based on whether a model is in production, is undergoing live testing, is undergoing recurring training, is idling, or any combination thereof. For example, the machine learner system can determine, at step 312, that a target model of the models has not being used to serve live traffic within a threshold period of time. In response, the machine learner system can warn a project owner (e.g., a developer user or an analyst user) of the target model to conserve resources at step 314. For example, the machine learner system can send a notification that includes a link to terminate resource consumption corresponding to maintenance (e.g., recurring training tasks) of the target model.

While processes or blocks are presented in a given order in FIG. 3, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 4:
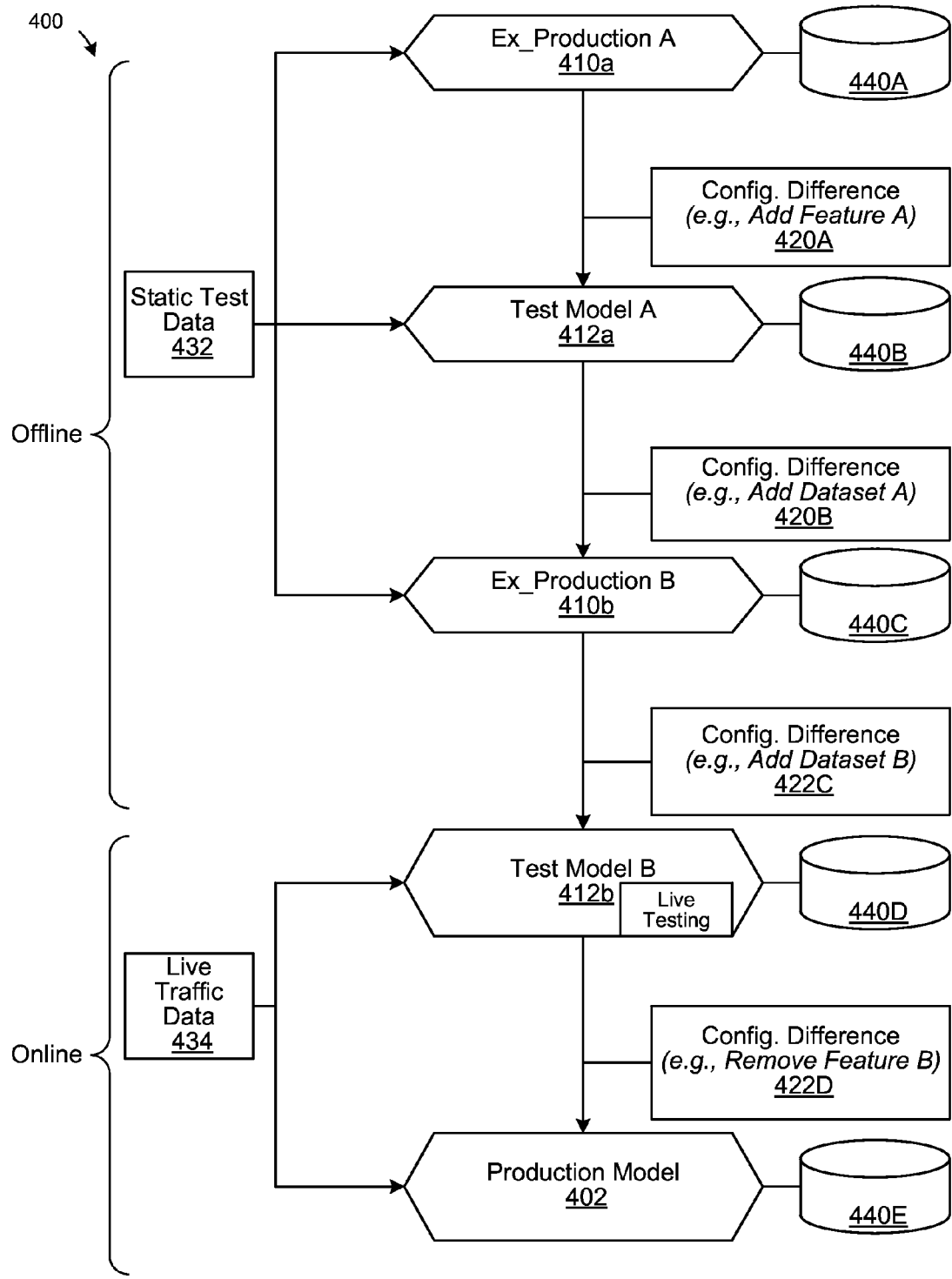
FIG. 4 is a data flow diagram illustrating an example of how a machine learner system tracks source information of a machine learning model, in accordance with various embodiments.

FIG. 4 is a data flow diagram illustrating an example of how a machine learner system tracks source information of a machine learning model, in accordance with various embodiments. FIG. 4 illustrates an example of a version history 400 of a production model 402 in the form of a provenance chain maintained by a machine learner system (e.g., the machine learner system 202 of FIG. 2). The version history 400 includes an ex-production model 410A and an ex-production model 410B. The version history 400 also includes a test model 412A and a test model 412B. The test model 412A is built based on a template copy of the ex-production model 410A. The ex-production model 410B can a variant of the test model 412A (e.g., built with updated training dataset compared to the test model 412A). The test model 412B can be built based on a template copy of the ex-production model 410B. The production model 402 can be a variant of the test model 412B.

In several embodiments, the version history 400 tracks training configuration differences between immediately related models. For example, the version history 400 can include: a training configuration difference 420A between the ex-production model 410A and the test model 412A, a training configuration difference 420B between the test model 412A and the ex-production model 410B, a training configuration difference 420C between the ex-production model 410B and the test model 412B, and a training configuration difference 420D between the test model 412B and the production model 402.

In several embodiments, the version history 400 can track evaluations (e.g., offline and/or online testing) of the machine learning models. For offline testing, the machine learner platform can evaluate a machine learning model using static test data 432. For online testing, the machine learner platform can evaluate a machine learning model using live traffic data 434. In some embodiments, the version history 400 can track experiment metadata of running the static test data 432 and/or the live traffic data 434 through the machine learning models. The experiment metadata of a machine learning model can be represented as statistical distribution of test results when testing the machine learning model, a comparison with expected results and the test results, a comparison with testing results of the production model 402 and the test results of the machine learning model, a comparison with testing results of a user indicated model and the test results of the machine learning model, or any combination thereof. For example, running the static test data 432 through the ex-production model 410A can yield experiment metadata 440A; running the static test data 432 through the test model 412A can yield experiment metadata 440B; running the static test data 432 through the ex-production model 410B can yield experiment metadata 440C; running the live traffic data 434 through the test model 412B can yield experiment metadata 440D; and running the live traffic data 434 through the production model 402 can yield experiment metadata 440E.

Social Networking System Overview

Various embodiments of the disclosed application services utilize or are part of a social networking system. Social networking systems commonly provide mechanisms enabling users to interact with objects and other users both within and external to the context of the social networking system. A social networking system user may be an individual or any other entity, e.g., a business or other non-person entity. The social networking system may utilize a web-based interface or a mobile interface comprising a series of inter-connected pages displaying and enabling users to interact with social networking system objects and information. For example, a social networking system may display a page for each social networking system user comprising objects and information entered by or related to the social networking system user (e.g., the user's "profile").

Social networking systems may also have pages containing pictures or videos, dedicated to concepts, dedicated to users with similar interests ("groups"), or containing communications or social networking system activity to, from or by other users. Social networking system pages may contain links to other social networking system pages, and may include additional capabilities, e.g., search, real-time communication, content-item uploading, purchasing, advertising, and any other web-based inference engine or ability. It should be noted that a social networking system interface may be accessible from a web browser or a non-web browser application, e.g., a dedicated social networking system application executing on a mobile computing device or other computing device. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, a social graph can include a set of nodes (representing social networking system objects, also known as social objects) interconnected by edges (representing interactions, activity, or relatedness). A social networking system object may be a social networking system user, nonperson entity, content item, group, social networking system page, location, application, subject, concept or other social networking system object, e.g., a movie, a band, or a book. Content items can include anything that a social networking system user or other object may create, upload, edit, or interact with, e.g., messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or idea.

A social networking system may enable a user to enter and display information related to the user's interests, education and work experience, contact information, demographic information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may enable a user to upload or create pictures, videos, documents, songs, or other content items, and may enable a user to create and schedule events. Content items and events may be represented by nodes in the social graph.

A social networking system may provide various means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

A social networking system may provide a variety of communication channels to users. For example, a social networking system may enable a user to email, instant message, or text/SMS message, one or more other users; may enable a user to post a message to the user's wall or profile or another user's wall or profile; may enable a user to post a message to a group or a fan page; or may enable a user to comment on an image, wall post or other content item created or uploaded by the user or another user. In least one embodiment, a user posts a status message to the user's profile indicating a current event, state of mind, thought, feeling, activity, or any other present-time relevant communication. A social networking system may enable users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection is a social network edge. Being friends in a social networking system may allow users access to more information about each other than would otherwise be available to unconnected users. For example, being friends may allow a user to view another user's profile, to see another user's friends, or to view pictures of another user. Likewise, becoming friends within a social networking system may allow a user greater access to communicate with another user, e.g., by email (internal and external to the social networking system), instant message, text message, phone, or any other communicative interface. Being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected (such as a soft or implicit connection) for the purposes of determining social context for use in determining the topic of communications. In at least one embodiment, users who belong to a common network are considered connected. For example, users who attend a common school, work for a common company, or belong to a common social networking system group may be considered connected. In at least one embodiment, users with common biographical characteristics are considered connected. For example, the geographic region users were born in or live in, the age of users, the gender of users and the relationship status of users may be used to determine whether users are connected. In at least one embodiment, users with common interests are considered connected. For example, users' movie preferences, music preferences, political views, religious views, or any other interest may be used to determine whether users are connected. In at least one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 5:
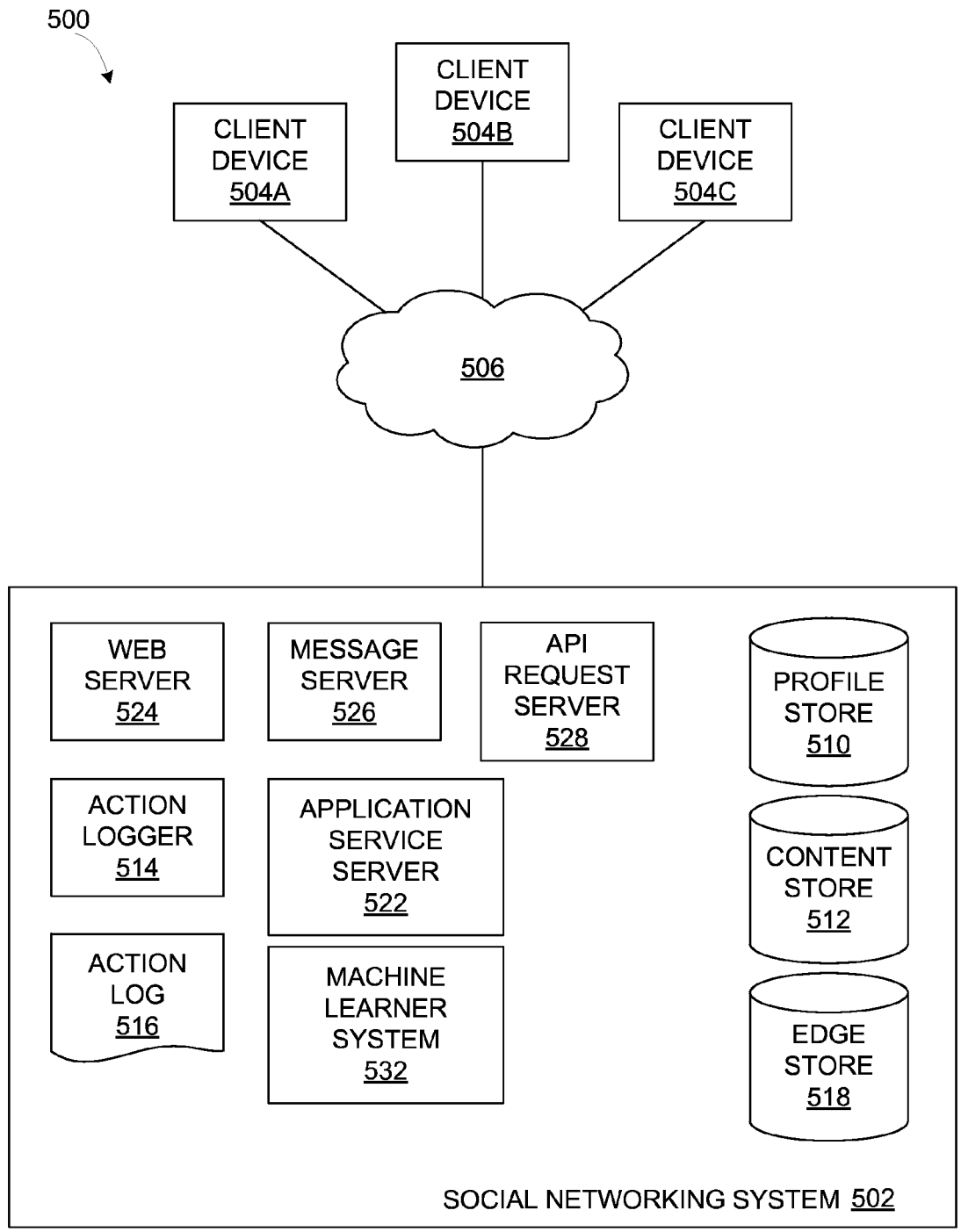
FIG. 5 is a high-level block diagram of a system environment suitable for a social networking system, in accordance with various embodiments.

FIG. 5 is a high-level block diagram of a system environment 500 suitable for a social networking system 502, in accordance with various embodiments. The system environment 500 shown in FIG. 5 includes the social networking system 502 (e.g., the application service system 200 of FIG. 2), a client device 504A, and a network channel 506. The system environment 500 can include other client devices as well, e.g., a client device 504B and a client device 504C. In other embodiments, the system environment 500 may include different and/or additional components than those shown by FIG. 5. The machine learner system 202 of FIG. 2 can be implemented in the social networking system 502.

Social Networking System Environment and Architecture

The social networking system 502, further described below, comprises one or more computing devices storing user profiles associated with users (i.e., social networking accounts) and/or other objects as well as connections between users and other users and/or objects. Users join the social networking system 502 and then add connections to other users or objects of the social networking system to which they desire to be connected. Users of the social networking system 502 may be individuals or entities, e.g., businesses, organizations, universities, manufacturers, etc. The social networking system 502 enables its users to interact with each other as well as with other objects maintained by the social networking system 502. In some embodiments, the social networking system 502 enables users to interact with third-party websites and a financial account provider.

Based on stored data about users, objects and connections between users and/or objects, the social networking system 502 generates and maintains a "social graph" comprising multiple nodes interconnected by multiple edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 502 adds and/or modifies edges connecting the various nodes to reflect the interactions.

The client device 504A is a computing device capable of receiving user input as well as transmitting and/or receiving data via the network channel 506. In at least one embodiment, the client device 504A is a conventional computer system, e.g., a desktop or laptop computer. In another embodiment, the client device 504A may be a device having computer functionality, e.g., a personal digital assistant (PDA), mobile telephone, a tablet, a smart-phone or similar device. In yet another embodiment, the client device 504A can be a virtualized desktop running on a cloud computing service. The client device 504A is configured to communicate with the social networking system 502 via a network channel 506 (e.g., an intranet or the Internet). In at least one embodiment, the client device 504A executes an application enabling a user of the client device 504A to interact with the social networking system 502. For example, the client device 504A executes a browser application to enable interaction between the client device 504A and the social networking system 502 via the network channel 506. In another embodiment, the client device 504A interacts with the social networking system 502 through an application programming interface (API) that runs on the native operating system of the client device 504A, e.g., IOS® or ANDROID™.

The client device 504A is configured to communicate via the network channel 506, which may comprise any combination of local area and/or wide area networks, using both wired and wireless communication systems. In at least one embodiment, the network channel 506 uses standard communications technologies and/or protocols. Thus, the network channel 506 may include links using technologies, e.g., Ethernet, 802.11, worldwide interoperability for microwave access (WiMAX), 3G, 4G, CDMA, digital subscriber line (DSL), etc. Similarly, the networking protocols used on the network channel 506 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 506 may be represented using technologies and/or formats including hypertext markup language (HTML) or extensible markup language (XML). In addition, all or some of links can be encrypted using conventional encryption technologies, e.g., secure sockets layer (SSL), transport layer security (TLS), and Internet Protocol security (IPsec).

The social networking system 502 includes a profile store 510, a content store 512, an action logger 514, an action log 516, an edge store 518, an application service server 522, a web server 524, a message server 526, an API request server 528, a machine learner system 532, or any combination thereof. In other embodiments, the social networking system 502 may include additional, fewer, or different modules for various applications.

User of the social networking system 502 can be associated with a user profile, which is stored in the profile store 510. The user profile is associated with a social networking account. A user profile includes declarative information about the user that was explicitly shared by the user, and may include profile information inferred by the social networking system 502. In some embodiments, a user profile includes multiple data fields, each data field describing one or more attributes of the corresponding user of the social networking system 502. The user profile information stored in the profile store 510 describes the users of the social networking system 502, including biographic, demographic, and other types of descriptive information, e.g., work experience, educational history, gender, hobbies or preferences, location and the like. A user profile may also store other information provided by the user, for example, images or videos. In some embodiments, images of users may be tagged with identification information of users of the social networking system 502 displayed in an image. A user profile in the profile store 510 may also maintain references to actions by the corresponding user performed on content items (e.g., items in the content store 512) and stored in the edge store 518 or the action log 516.

A user profile may be associated with one or more financial accounts, enabling the user profile to include data retrieved from or derived from a financial account. In some embodiments, information from the financial account is stored in the profile store 510. In other embodiments, it may be stored in an external store.

A user may specify one or more privacy settings, which are stored in the user profile, that limit information shared through the social networking system 502. For example, a privacy setting limits access to cache appliances associated with users of the social networking system 502.

The content store 512 stores content items (e.g., images, videos, or audio files) associated with a user profile. The content store 512 can also store references to content items that are stored in an external storage or external system. Content items from the content store 512 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system by displaying content related to users, objects, activities, or functionalities of the social networking system 502. Examples of social networking content items include suggested connections or suggestions to perform other actions, media provided to, or maintained by, the social networking system 502 (e.g., pictures or videos), status messages or links posted by users to the social networking system, events, groups, pages (e.g., representing an organization or commercial entity), and any other content provided by, or accessible via, the social networking system.

The content store 512 also includes one or more pages associated with entities having user profiles in the profile store 510. An entity can be a non-individual user of the social networking system 502, e.g., a business, a vendor, an organization, or a university. A page includes content associated with an entity and instructions for presenting the content to a social networking system user. For example, a page identifies content associated with the entity's user profile as well as information describing how to present the content to users viewing the brand page. Vendors may be associated with pages in the content store 512, enabling social networking system users to more easily interact with the vendor via the social networking system 502. A vendor identifier is associated with a vendor's page, thereby enabling the social networking system 502 to identify the vendor and/or to retrieve additional information about the vendor from the profile store 510, the action log 516 or from any other suitable source using the vendor identifier. In some embodiments, the content store 512 may also store one or more targeting criteria associated with stored objects and identifying one or more characteristics of a user to which the object is eligible to be presented.

The action logger 514 receives communications about user actions on and/or off the social networking system 502, populating the action log 516 with information about user actions. Such actions may include, for example, adding a connection to another user, sending a message to another user, uploading an image, reading a message from another user, viewing content associated with another user, attending an event posted by another user, among others. In some embodiments, the action logger 514 receives, subject to one or more privacy settings, content interaction activities associated with a user. In addition, a number of actions described in connection with other objects are directed at particular users, so these actions are associated with those users as well. These actions are stored in the action log 516.

In accordance with various embodiments, the action logger 514 is capable of receiving communications from the web server 524 about user actions on and/or off the social networking system 502. The action logger 514 populates the action log 516 with information about user actions to track them. This information may be subject to privacy settings associated with the user. Any action that a particular user takes with respect to another user is associated with each user's profile, through information maintained in a database or other data repository, e.g., the action log 516. Such actions may include, for example, adding a connection to the other user, sending a message to the other user, reading a message from the other user, viewing content associated with the other user, attending an event posted by another user, being tagged in photos with another user, liking an entity, etc.

The action log 516 may be used by the social networking system 502 to track user actions on the social networking system 502, as well as external website that communicate information to the social networking system 502. Users may interact with various objects on the social networking system 502, including commenting on posts, sharing links, and checking-in to physical locations via a mobile device, accessing content items in a sequence or other interactions. Information describing these actions is stored in the action log 516. Additional examples of interactions with objects on the social networking system 502 included in the action log 516 include commenting on a photo album, communications between users, becoming a fan of a musician, adding an event to a calendar, joining a groups, becoming a fan of a brand page, creating an event, authorizing an application, using an application and engaging in a transaction. Additionally, the action log 516 records a user's interactions with advertisements on the social networking system 502 as well as applications operating on the social networking system 502. In some embodiments, data from the action log 516 is used to infer interests or preferences of the user, augmenting the interests included in the user profile, and enabling a more complete understanding of user preferences.

Further, user actions that happened in particular context, e.g., when the user was shown or was seen accessing particular content on the social networking system 502, can be captured along with the particular context and logged. For example, a particular user could be shown/not-shown information regarding candidate users every time the particular user accessed the social networking system 502 for a fixed period of time. Any actions taken by the user during this period of time are logged along with the context information (i.e., candidate users were provided/not provided to the particular user) and are recorded in the action log 516. In addition, a number of actions described below in connection with other objects are directed at particular users, so these actions are associated with those users as well.

The action log 516 may also store user actions taken on external websites services associated with the user. The action log 516 records data about these users, including viewing histories, advertisements that were engaged, purchases or rentals made, and other patterns from content requests and/or content interactions.

In some embodiments, the edge store 518 stores the information describing connections between users and other objects on the social networking system 502 in edge objects. The edge store 518 can store the social graph described above. Some edges may be defined by users, enabling users to specify their relationships with other users. For example, users may generate edges with other users that parallel the users' real-life relationships, e.g., friends, co-workers, partners, and so forth. Other edges are generated when users interact with objects in the social networking system 502, e.g., expressing interest in a page or a content item on the social networking system, sharing a link with other users of the social networking system, and commenting on posts made by other users of the social networking system. The edge store 518 stores edge objects that include information about the edge, e.g., affinity scores for objects, interests, and other users. Affinity scores may be computed by the social networking system 502 over time to approximate a user's affinity for an object, interest, and other users in the social networking system 502 based on the actions performed by the user. Multiple interactions of the same type between a user and a specific object may be stored in one edge object in the edge store 518, in at least one embodiment. In some embodiments, connections between users may be stored in the profile store 510. In some embodiments, the profile store 510 may reference or be referenced by the edge store 518 to determine connections between users. Users may select from predefined types of connections, or define their own connection types as needed.

The web server 524 links the social networking system 502 via a network to one or more client devices; the web server 524 serves web pages, as well as other web-related content, e.g., Java, Flash, XML, and so forth. The web server 524 may communicate with the message server 526 that provides the functionality of receiving and routing messages between the social networking system 502 and client devices. The messages processed by the message server 526 can be instant messages, email messages, text and SMS (short message service) messages, photos, or any other suitable messaging technique. In some embodiments, a message sent by a user to another user can be viewed by other users of the social networking system 502, for example, by the connections of the user receiving the message. An example of a type of message that can be viewed by other users of the social networking system besides the recipient of the message is a wall post. In some embodiments, a user can send a private message to another user that can only be retrieved by the other user.

The application program interface (API) request server 528 enables external systems to access information from the social networking system 502 by calling APIs. The information provided by the social network may include user profile information or the connection information of users as determined by their individual privacy settings. For example, a system interested in predicting the probability of users forming a connection within a social networking system may send an API request to the social networking system 502 via a network. The API request server 528 of the social networking system 502 receives the API request. The API request server 528 processes the request by determining the appropriate response, which is then communicated back to the requesting system via a network.

The application service server 522 can implement at least one application service, for example, one of the application services 204 of FIG. 2. In several embodiments, the social networking system 502 can include multiple application service servers implementing multiple application services.

The machine learner system 532 can be the machine learner system 202 of FIG. 2. The machine learner system 532 can enable developer/analyst users to track, compare, build, modify, evaluate, and/or deploy one or more production models corresponding to one or more application services of the social networking system 502. The machine learner system 532 can also enable developer/analyst users to track, compare, build, modify, train (e.g., manually or automatically according to a recurring schedule), evaluate, and/or deploy one or more latent models that have potential to replace the production models.

Functional components (e.g., circuits, devices, engines, modules, and data storages, etc.) associated with the application service system 200 of FIG. 2, the machine learner system 202 of FIG. 2 the machine learning workflow 100 of FIG. 1, and/or the social networking system 502 of FIG. 5, can be implemented as a combination of circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

Figure 6:
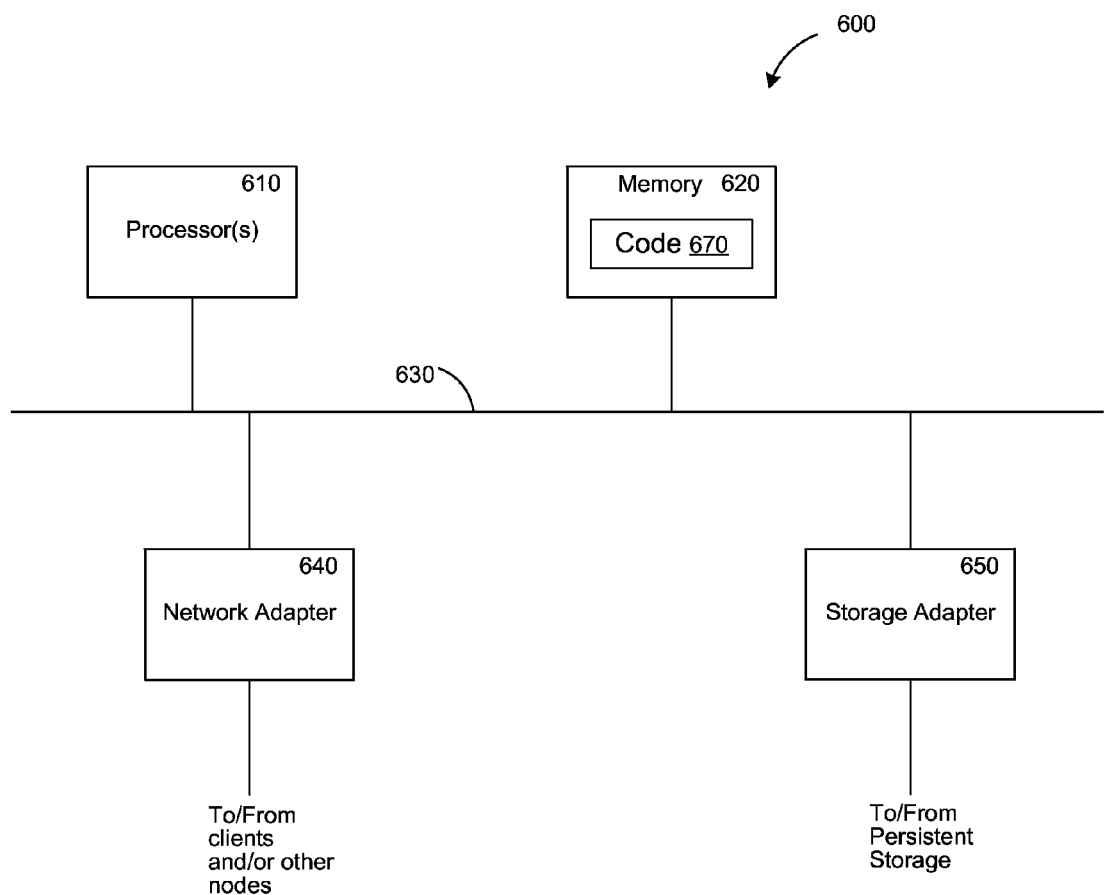
FIG. 6 is a block diagram of an example of a computing device, which may represent one or more computing device or server described herein, in accordance with various embodiments.

FIG. 6 is a block diagram of an example of a computing device 600, which may represent one or more computing device or server described herein, in accordance with various embodiments. The computing device 600 can be one or more computing devices that implement the application service system 200 of FIG. 2 and/or the machine learner system 202 of FIG. 2. The computing device 600 can execute at least part of the machine learning workflow 100 of FIG. 1 and/or the method 300 of FIG. 3. The computing device 600 includes one or more processors 610 and memory 620 coupled to an interconnect 630. The interconnect 630 shown in FIG. 6 is an abstraction that represents any one or more separate physical buses, point-to-point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 610 is/are the central processing unit (CPU) of the computing device 600 and thus controls the overall operation of the computing device 600. In certain embodiments, the processor(s) 610 accomplishes this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computing device 600. The memory 620 represents any form of random access memory (RAM), read-only memory (ROM), flash memory, or the like, or a combination of such devices. In use, the memory 620 may contain a code 670 containing instructions according to the mesh connection system disclosed herein.

Also connected to the processor(s) 610 through the interconnect 630 are a network adapter 640 and a storage adapter 650. The network adapter 640 provides the computing device 600 with the ability to communicate with remote devices, over a network and may be, for example, an Ethernet adapter or Fibre Channel adapter. The network adapter 640 may also provide the computing device 600 with the ability to communicate with other computers. The storage adapter 650 enables the computing device 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computing device 600 by downloading it from a remote system through the computing device 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; and/or optical storage media; flash memory devices), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

What is claimed is:

1. A computer-implemented method, comprising:
    receiving a training configuration based on modifying a production copy template of a production machine learning model for an application service;
    scheduling a recurring training session based on the training configuration to produce a latent model;
    tracking one or more differences in training configurations of the latent model as compared to the production copy template;
    computing an evaluative metric of the latent model by performing testing of the latent model as compared to the production copy template;
    generating a machine learner interface to access a model tracker database that indexes the evaluative metric and the tracked differences associated with the latent model, wherein the machine learner interface provides an interface element to trigger launching the latent model into production;
    receiving a search query targeting a particular dataset or a particular data feature; and
    in response to receiving the search query, presenting one or more target machine learning models and evaluation statistics of the target machine learning models by querying the model tracker database to identify the target machine learning models based on the target machine learning models utilizing the particular dataset or the particular data feature.

2. The computer-implemented method of claim 1, further comprising:
    tracking a version history of the latent model, wherein the version history is represented by a provenance chain of one or more machine learning models that are based on one another in order; and
    wherein tracking the version history includes tracking one or more modifications from a previous machine learning model in the provenance chain to a subsequent machine learning model in the provenance chain.

3. The computer-implemented method of claim 2, further comprising:
    identifying the latent model as being corrupt; and
    identifying a problem data source or a problem data feature based on a tracked training configuration modification of the latent model as compared to a previously working model in the version history.

4. The computer-implemented method of claim 3, further comprising:
    in response to identifying the latent model as being corrupt, rolling back the latent model from production; and
    pushing the previously working model into production for the application service.

5. The computer-implemented method of claim 1, further comprising detecting corruption of the latent model based on the evaluative metric of the latent model.

6. The computer-implemented method of claim 1, wherein the machine learner interface enables a developer or analyst user of the application service to build, evaluate, and deploy the latent model.

7. The computer-implemented method of claim 1, further comprising generating a comparison report by comparing at least one of evaluative metrics or training configurations between the production copy template and the latent model.

8. The computer-implemented method of claim 1, further comprising:
    receiving, via the machine learner interface, a model selection of a target model other than the production copy template and the latent model; and
    rendering a comparison report between the latent model and the target model.

9. The computer-implemented method of claim 1, wherein the tracked differences in the training configurations of the latent model and the production copy template includes differences in one or more sources of training datasets, one or more training datasets, or one or more data features, that were used to train the latent model.

10. The computer-implemented method of claim 1, further comprising:
    computing a ranking of the one or more target machine learning models, wherein the ranking is based on evaluative metrics corresponding to the one or more target machine learning models stored in the model tracker database; and
    presenting the ranking.

11. A machine learner platform system, comprising:
    a model tracking engine configured to track one or more machine learning models for one or more application services;
    a model tracker database configured to record version history of the machine learning models tracked by the model tracking engine;
    a model trainer engine configured to task out a model training task to one or more computing devices, wherein the model tracking engine is configured to track a training configuration of a resulting model from the model training task in the model tracker database;

a model evaluation engine configured to compute an evaluative metric for the resulting model, wherein the model evaluation engine is configured to compute a ranking of at least a subset of the machine learning models based on evaluative metrics corresponding to the subset of the machine learning models stored in the model tracker database; and a platform interface configured to present the ranking.

12. The machine learner platform system of claim 11,
wherein the platform interface is further configured to present a comparison report of two or more of the machine learning models; and wherein the model evaluation engine is configured to generate the comparison report by comparing results of running a test dataset through the two or more of the machine learning models.

13. The machine learner platform system of claim 11, wherein the model training task is a recurring task.

14. The machine learner platform system of claim 11,
wherein the platform interface is further configured to receive an indication that a dataset is defective; and wherein, in response to the platform interface receiving the indication, the model tracking engine is further configured to query the model tracker database to identify one or more of the machine learning models that used the dataset to train and to mark the identified one or more of the machine learning models as potentially defective in the platform interface.

15. The machine learner platform system of claim 11,
wherein the platform interface is further configured to receive a provenance query targeting a target machine learning model; and wherein the platform interface is further configured to render a diagram representing the version history from the model tracker database, the diagram illustrating one or more related machine learning models of the target machine learning model.

16. The machine learner platform system of claim 11, wherein the platform interface is further configured to:

receive a search query targeting a particular dataset or a particular data feature; and in response to receiving the search query, present one or more target machine learning models and evaluation statistics of the target machine learning models by querying the model tracker database to identify the target machine learning models that utilized the particular dataset or the particular data feature.

17. The machine learner platform system of claim 16, wherein the platform interface is further configured to present one or more deployment statuses corresponding to the target machine learning models in response to receiving the search query.

18. A non-transitory computer readable data storage memory storing computer-executable instructions that, when executed, cause a computer system to perform a computer-implemented method comprising:

identifying a list of models tracked by a machine learner platform servicing one or more application services;

routing live traffic to one or more of the models according to one or more live testing designations or production designations of the one or more of the models;

determining that a target model of the models has not being used to serve live traffic within a threshold period of time; and sending a notification to a project owner of the target model, wherein the notification includes a link to terminate resource consumption corresponding to maintenance of the target model.

19. The non-transitory computer readable data storage memory of claim 18, wherein the method further comprises classifying the models based on whether a model is in production, is undergoing live testing, is undergoing recurring training, is idling, or any combination thereof.

20. The non-transitory computer readable data storage memory of claim 18, wherein the method further comprises launching a live testing or production deployment of one of the models, in response to a user command received through a platform interface.

* * * * *

UNITED STATES PATENT AND TRADEMARK OFFICE
CERTIFICATE OF CORRECTION

PATENT NO. : 9,996,804 B2
APPLICATION NO. : 14/684041
DATED : June 12, 2018
INVENTOR(S) : Stuart Michael Bowers et al.

It is certified that error appears in the above-identified patent and that said Letters Patent is hereby corrected as shown below:

On the Title Page

In Abstract (57), Line 9, "after "deploying, or" delete "compare" and insert -- comparing --.

In the Claims

Column 22, Line 23-24, after "models has not" delete "being" and insert -- been --.

Signed and Sealed this
Eleventh Day of December, 2018

Andrei Iancu
*Director of the United States Patent and Trademark Office*